US010803501B1

(12) United States Patent
Jacobs, II et al.

(10) Patent No.: US 10,803,501 B1
(45) Date of Patent: Oct. 13, 2020

(54) SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM

(71) Applicant: Desprez, LLC, New London, NH (US)

(72) Inventors: James L. Jacobs, II, Amherst, NH (US); Steven M. Lynch, Hudson, NH (US)

(*) Notice: Subject to any disclaimer, the term of this patent is extended or adjusted under 35 U.S.C. 154(b) by 928 days.

(21) Appl. No.: 15/073,566

(22) Filed: Mar. 17, 2016

Related U.S. Application Data

(60) Provisional application No. 62/134,362, filed on Mar. 17, 2015.

(51) Int. Cl.
*G06Q 30/00* (2012.01)
*G06Q 30/06* (2012.01)
*G06F 16/248* (2019.01)
*G06F 16/2457* (2019.01)

(52) U.S. Cl.
CPC ....... *G06Q 30/0611* (2013.01); *G06F 16/248* (2019.01); *G06F 16/24575* (2019.01)

(58) Field of Classification Search
None
See application file for complete search history.

(56) References Cited

U.S. PATENT DOCUMENTS

| | | |
|---|---|---|
| 4,495,559 A | 1/1985 | Gelatt, Jr. et al. |
| 5,117,354 A | 5/1992 | Long |
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |

(Continued)

FOREIGN PATENT DOCUMENTS

| | | | |
|---|---|---|---|
| WO | 154476 A2 | 8/2001 | |
| WO | 171626 A2 | 9/2001 | |

(Continued)

OTHER PUBLICATIONS

Defining Lead Time for APS Planning; http://t3.apptrix.com/syteline/Language/en-US/Other/Process/Defining_Lead_Time.htm.

(Continued)

*Primary Examiner* — Mila Airapetian
(74) *Attorney, Agent, or Firm* — Caldwell Intellectual Property Law

(57) ABSTRACT

In an exemplary embodiment, software made in accordance with the present invention interfaces with a supplier database in order to provide a user with an interactive supplier list. The user may then interact with the supplier list to identify one or more preferred providers, select one or more suppliers from the supplier list, and cause the software to generate a request for pricing for each selected provider. Various corresponding and related systems, methods, and software are described.

14 Claims, 6 Drawing Sheets

(56) References Cited

U.S. PATENT DOCUMENTS

| | | |
|---|---|---|
| 6,112,133 A | 8/2000 | Fishman |
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Carlton-Foss |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,917,847 B2 | 7/2005 | Littlejohn et al. |
| 6,922,701 B1 | 7/2005 | Ananian et al. |
| 7,006,084 B1 | 2/2006 | Buss et al. |
| 7,058,465 B2 | 6/2006 | Emori et al. |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 * | 3/2009 | McBrayer ............ G06Q 10/063 705/7.13 |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0069295 A1 * | 6/2002 | Edwards ................ H04L 29/06 709/246 |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0195824 A1 * | 10/2003 | Duffy ................ G06Q 10/0637 705/7.36 |
| 2003/0212610 A1 | 11/2003 | Duffy et al. |
| 2003/0220911 A1 | 11/2003 | Tompras |
| 2004/0008876 A1 | 1/2004 | Lure et al. |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 3/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |
| 2011/0040542 A1 | 2/2011 | Sendhoff et al. |
| 2011/0047140 A1 | 2/2011 | Free |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson et al. |
| 2013/0097259 A1 | 4/2013 | Li et al. |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 | 8/2013 | Ho |
| 2013/0293580 A1 | 11/2013 | Spivack |
| 2013/0297320 A1 | 11/2013 | Buser et al. |

(56) References Cited

U.S. PATENT DOCUMENTS

| | | |
|---|---|---|
| 2013/0297460 A1 | 11/2013 | Spivack |
| 2013/0311914 A1 | 11/2013 | Daily |
| 2013/0325410 A1 | 12/2013 | Jung et al. |
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |
| 2014/0157579 A1 | 6/2014 | Chhabra et al. |
| 2014/0207605 A1 | 7/2014 | Allin et al. |
| 2014/0229316 A1 | 8/2014 | Brandon |
| 2014/0279177 A1 | 9/2014 | Stump |
| 2014/0379119 A1 | 12/2014 | Sciacchitano et al. |
| 2015/0055085 A1 | 2/2015 | Fonte et al. |
| 2015/0066189 A1 | 3/2015 | Mulligan et al. |
| 2015/0127480 A1 | 5/2015 | Herrman et al. |
| 2015/0234377 A1 | 8/2015 | Mizikovsky |

FOREIGN PATENT DOCUMENTS

| | | |
|---|---|---|
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2013058764 A1 | 4/2013 |
| WO | 2014152396 A2 | 9/2014 |

OTHER PUBLICATIONS

Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk. http://apps.123dapp.com/catch/.
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory.
EMachineShop. "Emachineshop Features." http://www.emachineshop.com/machine-shop/Features/page518.html.
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type3.us/content/download/2202/405535/file/New%20Feature_Type3ToCatia_2010_US%20old.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2015, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

EXAMPLE USER DATABASE

| Primary Key | Native Information ||| Imported Information |||
|---|---|---|---|---|---|---|
| | Supplier | Distribution List | User Star Rating | Comments | Processes | ZIP Code | Community Rating |
| 1 | Supplier 1 | Prototypers, Trusted manufacturers | 2 | | Sheet Metal, Injection Molding | 03064 | 3 |
| 2 | Supplier 2 | Large Batch | 3 | Great service, great product | Injection Molding | 03064 | 2 |
| 3 | Supplier 3 | Trusted manufacturers | 3 | Contact is Jenny (867-5309) | Sheet Metal | 03051 | 2 |
| 4 | Supplier 4 | Prototypers | 1 | Many broken/defective parts | Sheet Metal, Injection Molding | 03064 | 2 |
| 6 | Supplier 6 | Trusted manufacturers | 3 | Great product, difficult to work with | Sheet Metal, Injection Molding | 03051 | 3 |
| 7 | Supplier 7 | | 2 | | Sheet Metal, Injection Molding | 03051 | 2 |
| 8 | Supplier 8 | Prototypers | 1 | | Sheet Metal, Injection Molding | 03064 | 1 |
| 10 | Supplier 10 | Prototypers, Trusted manufacturers | 3 | | Injection Molding | 03051 | 1 |

FIG. 1B

EXAMPLE SUPPLIER DATABASE

| Primary Key | Supplier | Materials | Processes | ZIP Code | Community Rating |
|---|---|---|---|---|---|
| 1 | Supplier 1 | Aluminum, Brass | Sheet Metal, Injection Molding | 03064 | 3 |
| 2 | Supplier 2 | Aluminum, Brass | Injection Molding | 03064 | 2 |
| 3 | Supplier 3 | Brass, Stainless Steel | Sheet Metal | 03051 | 2 |
| 4 | Supplier 4 | Aluminum, Stainless Steel | Sheet Metal, Injection Molding | 03064 | 2 |
| 5 | Supplier 5 | Aluminum, Brass, Stainless Steel | Sheet Metal, Injection Molding | 77566 | 2 |
| 6 | Supplier 6 | Aluminum | Sheet Metal, Injection Molding | 03051 | 3 |
| 7 | Supplier 7 | Aluminum, Brass | Sheet Metal, Injection Molding | 03051 | 2 |
| 8 | Supplier 8 | Aluminum, Stainless Steel | Sheet Metal, Injection Molding | 03064 | 1 |
| 9 | Supplier 9 | Aluminum | Sheet Metal | 03051 | 3 |
| 10 | Supplier 10 | Aluminum, Brass | Injection Molding | 03051 | 1 |

SYSTEMS, METHODS, AND SOFTWARE FOR GENERATING, CUSTOMIZING, AND AUTOMATEDLY E-MAILING A REQUEST FOR QUOTATION FOR FABRICATING A COMPUTER-MODELED STRUCTURE FROM WITHIN A CAD PROGRAM

RELATED APPLICATION DATA

This application claims the benefit of priority of U.S. Provisional Patent Application Ser. No. 62/134,362, filed on Mar. 17, 2015, and titled "SYSTEMS, METHODS, AND SOFTWARE FOR ASSISTING A USER IN GENERATING A REQUEST FOR PRICING FOR FABRICATING A COMPUTER-MODELED STRUCTURE WITHIN A CAD PROGRAM," which is incorporated by reference herein in its entirety.

FIELD OF THE INVENTION

The present invention generally relates to the field of computer-aided design. In particular, the present invention is directed to systems, methods, and software for assisting a user in generating a request for pricing for fabricating a computer-modeled structure within a CAD program.

BACKGROUND

Presently, CAD (computer-aided design) programs allow users to create computer models of products to be manufactured. After a design is complete, the user typically then seeks out one or more suppliers to which they may send a request for pricing (hereinafter "RFP") in order to obtain a price associated with fabricating the designed structure. This process of seeking out suppliers tends to create additional work and expense for a user and/or their employer, as this process requires the user or an associated agent to research individual suppliers, often relying on easily misplaced notes and personal experience to identify possible suppliers to use for a particular project or design.

SUMMARY OF THE DISCLOSURE

A method of assisting a user in generating a request for pricing (RFP) of a price for fabricating one or more instantiations of a structure represented in a computer model. The method being executed in a CAD program and including presenting to the user, in an RFP user interface, a list of suppliers that provide fabrication services; receiving from the user via the RFP user interface a selection of at least one supplier from the list of suppliers to create at least one selected supplier; generating the RFP; and automatedly sending the RFP to each of the at least one supplier for which a selection is received in conjunction with the receiving.

A machine-readable storage medium containing machine-executable instructions for performing a method assisting a user in generating a request for pricing (RFP) of a price for fabricating one or more instantiations of a structure represented in a computer model, the method being executed in a CAD program and comprising: a first set of machine-executable instructions for presenting to the user, in an RFP user interface, a list of suppliers that provide fabrication services; a second set of machine-executable instructions receiving from the user via the RFP user interface a selection of at least one supplier from the list of suppliers to create at least one selected supplier; a third set of machine-executable instructions for generating the RFP; and a fourth set of machine-executable instructions for automatedly sending the RFP to each of the at least one supplier for which a selection is received in conjunction with said receiving.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1B is a table illustrating aspects of an exemplary user database;

FIG. 1C is a table illustrating aspects of an exemplary supplier database;

FIG. 3 is a set of representative screenshots depicting various aspects of an exemplary user interface implemented in accordance with aspects of the invention.

DETAILED DESCRIPTION

Aspects of the present invention include systems, methods, and software for assisting a user in generating a request for pricing (RFP) for fabricating a computer-modeled structure. Herein, an RFP may be a request for a price such as a rough estimate, a quote, a firm fixed cost, or anything in between these, among others. A structure may be an object or part having a particular geometry, while a computer model may be a virtual representation of a structure and may be created using appropriate computer-aided design programs. Examples of structures include a piece of sheet metal, a solid cube, a cylindrical pipe, an injection molded plastic toy, an article of apparel or clothing such as a shirt made from cotton, and an assembly of various parts such as a vehicle, among others. In some embodiments, software made in accordance with the present invention interfaces with a supplier database in order to provide a user with an interactive supplier list. The user may then interact with the supplier list to identify one or more preferred providers, select one or more suppliers from the supplier list, and cause the software to generate an RFP for each selected provider. One or more aspects of the present invention can be implemented in any of a wide variety of manners, such as within a single computing device or by two or more networked computing devices, among others. In some embodiments, functionalities of the system may be integrated into computer modeling programs directly via add-on software.

As would be apparent to one reasonably skilled in the art, the invention may be applied to other manufacturing types, including but not limited to the manufacture of apparel. Both sheet metal and apparel designers use CAD systems to design their products, using sheets of flat, material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. CAD programs may be used to visualize the shape of the finished product. In both sheet metal and apparel manufacturing the sheet (metal or fabric) may be cut or stamped by a variety of methods using computerized machines. Units are moved from station to station during manufacture. Where sheet metal is connected by rivets or welding, sheet fabric is connected by stitching or gluing. Surface finishes may be applied to both; both may be painted, silk-screened, or otherwise covered with a protective substance.

Figure 1A:
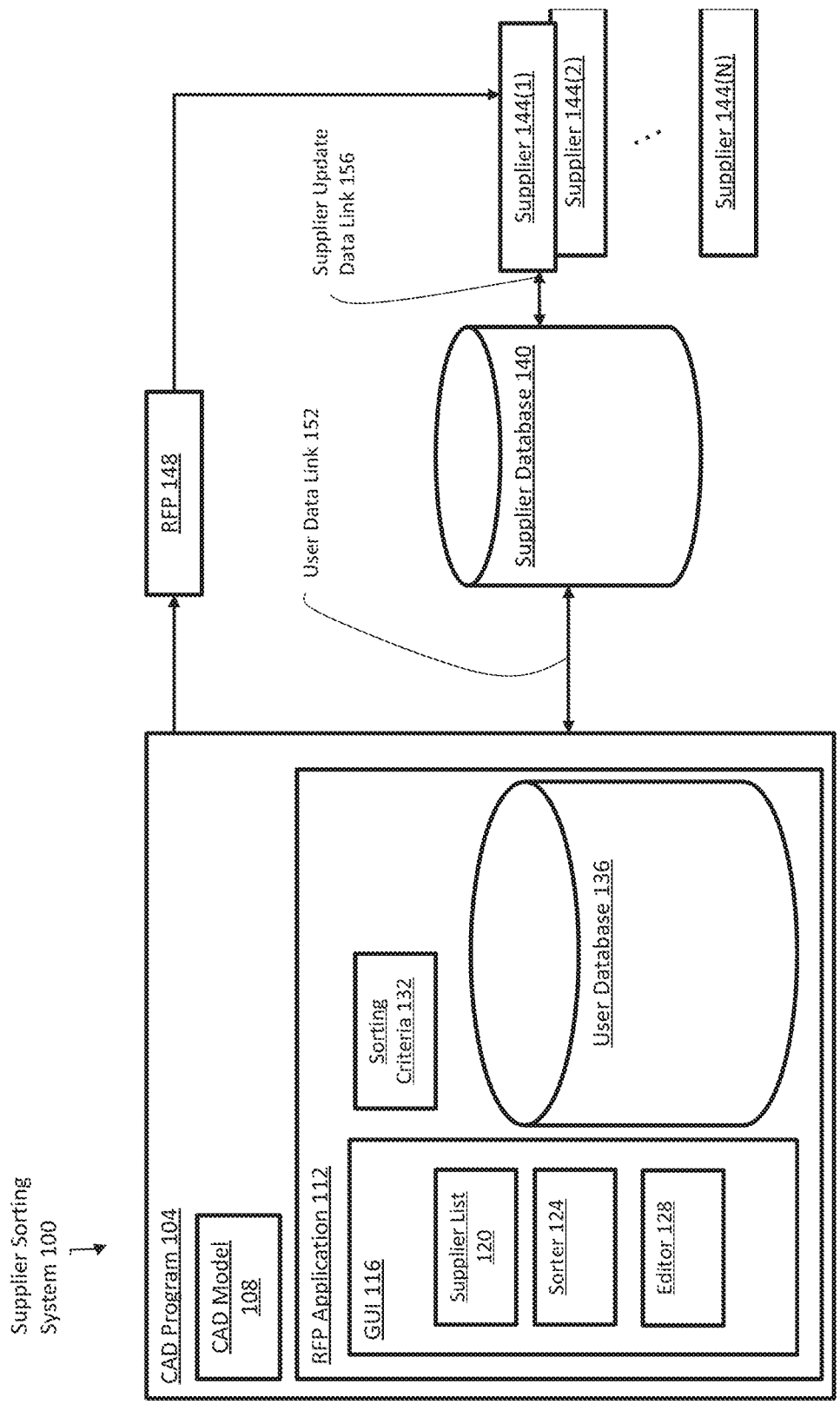
FIG. 1A is a high-level block diagram of an RFP system for assisting a user in generating an RFP for fabricating a computer-modeled structure.

Turning now to the drawings, FIG. 1A illustrates an exemplary RFP system 100 made in accordance with the present invention. In this example, RFP system 100 includes a CAD program 104 and a CAD model 108 associated with the CAD program. CAD program 104 may allow a user to design or edit computer-modeled structures, such as CAD model 108, which may be imported from another location and may be designed using another CAD program. CAD model 108 may specify desired shapes, properties, and/or other aspects of a structure that a user may request a supplier (or manufacturer) to fabricate in accordance with such information. System 100 further includes an RFP application 112, which in the embodiment shown is contained within CAD program 104. In accordance with various aspects of the invention, RFP application 112 provides a user of CAD program 104 with the ability to review supplier information efficiently and to select the best supplier based on a plurality of relevant factors. RFP application 112 may be an application included within CAD program 104, such as an add-on module or an integral (or native) part of the CAD program, capable of retrieving a list of suppliers and presenting that list to a user, preferably in an interactive form. It is noted that although FIG. 1A depicts CAD model 108 and RFP application 112 as being included within CAD program 104 in this example, it will be appreciated that, in some embodiments, the CAD model and RFP application may be provided separately from the CAD program provided that the CAD model is accessible by the CAD program and the RFP application is able to interface and/or operate in conjunction with the CAD program and CAD model.

In the example of FIG. 1A, RFP application 112 contains a number of subcomponents. For example, RFP application 112 includes a graphical user interface (GUI) 116 enabling interaction between a user and CAD program 104 and/or RFP application 112. RFP application 112 and/or CAD program 104 may cause GUI 116 to appear on a computer monitor, tablet, or mobile device, for example, and the GUI may present a user with a supplier list 120, which may include a list of suppliers and information associated therewith, as well as controls a user may manipulate to interact with the supplier list. For example, supplier list 120 may contain a list of suppliers capable of fabricating a structure specified in CAD model 108 and information associated with each supplier such as ratings and capabilities, among others.

In the present embodiment, GUI 116 further includes a sorter 124, which may be a window or set of controls that enable a user to interact with supplier list 120. For example, a user may sort supplier list 120 as a function of information included therein by manipulating a component of GUI 116 (e.g., using a mouse or other pointing device) in order to activate sorter 124. Such information may include, for example, supplier ratings and capabilities, among others. Sorter 124 may operate in a binary fashion (e.g., by sorting suppliers according to a certain capability, causing GUI 116 to list suppliers having that capability separately from suppliers that do not possess that capability) or in one or more other fashions (e.g., sorting suppliers from highest rating to lowest rating, alphabetically, and/or according to distances between the user's office and individual supplier facilities, among others).

In some embodiments, though not shown in FIG. 1A, RFP application 112 and/or sorter 124 may interface with one or more mapping, ranking, or capability-listing databases, websites, or applications, among others in order to populate supplier list 120 and/or enable a user to sort suppliers based on information received or derived therefrom. Further, sorter 124 may interface with one or more global positioning systems (not shown) in order to calculate distances, such as a distance between the user's office and individual supplier facilities, and/or to determine a location of a supplier's delivery truck. In such embodiments, sorter 124 may enable a user to sort suppliers based on particular suppliers' distances from the user, the location of a suppliers' delivery trucks, or an estimated delivery or response time sorter 124 derives from one or both, among others. GUI 116 further includes an editor 128, which may include a window or other user interface allowing a user to add or remove one or more suppliers and/or information associated with one or more suppliers in supplier list 120.

In this example, RFP application 112 further includes sorting criteria 132, which may include a data structure containing one or more rules or procedures specifying how sorter 124 should sort supplier list 120. For example, sorting criteria 132 may contain rules and/or procedures that cause sorter 124 to sort suppliers in supplier list 120 in alphabetical order and/or in order from highest to lowest rating, among others. In addition, sorter 124 may contain a set of initial sorting rules to be applied immediately to supplier list 120 once the sorter is activated. RFP application 112 may also include one or more user database 136, which may contain information associated with suppliers a designer or other user routinely uses and/or other suppliers a user indicates as being potential suppliers, either for any project or design or for a particular project or design. User database 136 may store primary keys identifying each supplier (or any type of data suitable for uniquely identifying suppliers) and user-provided information associated with suppliers such as user-defined distribution lists and notes. User database 136 may also contain data from a supplier database, which may be imported therefrom and/or periodically updated. FIG. 1B illustrates an exemplary selection of information that user database 136 may include. Such information may include one or more fields, such as primary key and/or supplier name, distribution lists to which the user has added one or more suppliers, and one or more ratings and/or comments that users have caused to be associated with one or more suppliers. User database 136 may further include fields associating one or more suppliers with one or more capabilities, geographical locations, and/or community ratings, as illustrated in FIG. 1B. Notably, although some fields are indicated as being "native" and others are indicated as being "imported" (e.g., from supplier database 140) in FIG. 1B, any of these fields may be native or imported, as desired. It is noted that although FIG. 1A depicts sorting criteria 132 and user database 136 as being included within RFP application 112 in this example, it will be appreciated that, in some embodiments, the sorting criteria and user database may be provided separately from the RFP application 112 and/or CAD program 104 provided that the CAD program and/or RFP application can access and modify the sorting criteria and user database. It is further noted that any of the databases disclosed herein may comprise two or more databases.

Further describing the present embodiment, system 100 includes a supplier database 140 by either an internal third party, such as a user company database of suppliers or an external third party data source such as mfg.com or thomasnet.com, which may be created and maintained by a user, designer, or by a third party and may be personal to a particular user. Although supplier database is shown as being separate from CAD program 104, in some embodiments supplier database 140 may be located within CAD program 104, within a supplier's project life-cycle management (PLM) system, or may be external to a user. Supplier database 140 may store information associated with one or more suppliers, which may in some embodiments be predefined by a user. Individual suppliers and/or other entities may provide such information directly or indirectly to the supplier database, and such information may be specific to a particular user, a particular type of design or structure, and/or a particular industry, though in some cases such information may apply to any user, type of design or structure, and/or any industry. For example, supplier database 140 may store primary keys identifying each supplier (or any type of data suitable for uniquely identifying suppliers such as supplier names, ratings, and information specifying processes the supplier is capable of performing). In some embodiments, a user may add suppliers from supplier database 140 to user database 136 and, optionally, provide notes or rankings associated with such added suppliers. It is noted that in this embodiment, supplier database 140 or a subset of supplier database 140 may be saved or mirrored to user database 136 and stored there. In an alternative embodiment, user database 136 may be optional, and information stored therein may be saved within supplier database 140, which may be accessed directly each time information is required instead of accessing user database 136. FIG. 1C illustrates an exemplary selection of information that supplier database 140 may include. Such information may include one or more fields that may contain information associated with suppliers, such as primary key and/or supplier name, materials workable by a given supplier, capabilities and/or processes the supplier can perform, one or more geographical locations associated with the supplier (e.g., a zip code associated with a manufacturing facility), and a rating, such as a star rating and/or community rating. It is noted that although FIG. 1A depicts supplier database 140 as separate from CAD program 104 in this example, it will be appreciated that in some embodiments it may be contained within or otherwise implemented by CAD program 104 or RFP application 112. In some embodiments, RFP application 112 or CAD program 104 may contain supplier database 140 and system 100 may implement the functionality of user database 136 and supplier database 140 using a single database or multiple networked or otherwise linked databases.

In this example, RFP system 100 further includes a plurality of suppliers 144(1) to 144(N), such as "Supplier 1" 144(1), "Supplier 2" 144(2), and up to any number of suppliers (designated by "Supplier N" 144(N)), which may include one or more suppliers and/or aggregators of supplier information. Suppliers 144(1) to 144(N) may be a supplier that can receive RFPs and provide pricing based thereon. In some embodiments, suppliers 144(1) to 144(N) may provide their name, capabilities, and any other information directly or indirectly to supplier database 140. For example, suppliers 144(1) to 144(N) may provide information to supplier database 140 indicating that the supplier is capable of working aluminum and brass with a certain amount of precision, which the supplier may indicate using, for example, a 5-star rating system (e.g., more stars indicating more precision). Alternatively or additionally, an aggregator of suppliers may provide such information, which may additionally include ratings of quality, performance, and/or attentiveness and/or other ratings drawn from other users or designers or other sources. For example, in some embodiments, an aggregator may derive ratings for individual suppliers from various sources, such as independent websites or magazines or one or more individual users' user databases, among others, and provide those ratings to a user's user database. In some cases, aggregators may provide basic information associated with suppliers (e.g., supplier capabilities) to any user free of charge while requiring a one-time or recurring (e.g., monthly) fee to receive ratings the aggregator has independently derived.

In the present embodiment, system 100 further includes an RFP 148 that CAD program 104 is operable to produce, though in other embodiments RFP application 112 may also or alternatively be operable to produce the RFP. RFP 148 may include information derived from CAD model 108 and/or information input by a user, among other information. Such information may provide details enabling fabrication of one or more structures, any necessary lead-time or other timing or scheduling details or requirements, and/or information identifying a particular designer or user who generated RFP 148 and/or who transmitted the RFP to one or more suppliers 144(1) to 144(N). CAD program 104 and/or RFP application 112 may be operable to send RFP 148 to one or more suppliers 144(1) to 144(N) via e-mail or other suitable means for communicating documents. However, in some embodiments the CAD program and/or RFP application may, optionally as a function of a user setting, only allow printing of the RFP and prevent electronic or other transfer of the RFP in an attempt to ensure that unauthorized parties cannot intercept the RFP. Such functionality may be particularly useful, for example, when an RFP contains trade secrets, government classified information, or other sensitive information.

System 100 further provides a number of data links to enable data communication between various portions thereof; system 100 may implement these links in the form of, for example, an Internet connection, a local network connection, and/or any other connection between electronic devices or portions of one or more devices. For example, system 100 provides a user data link 152, which, in this embodiment, enables communication between CAD program 104 and supplier database 140. For example, RFP application 112 may retrieve supplier information from supplier database 140 via user data link 152. Further, user database 136 and supplier database 140 may synchronize primary keys or other information via user data link 152. In some embodiments, RFP application 112 and/or CAD program 104 may derive information associated with one or more suppliers 144(1) to 144(N) from various sources, such as independent websites or magazines or one or more individual users' user databases, among others, and store those ratings in one or more users' user database 136 in association with one or more corresponding suppliers.

System 100 further provides a supplier update data link 156, which may be one or more data links between supplier database 140 and suppliers 144(1) to 144(N) that transmit information and updates from the suppliers describing their processes and capabilities, and messages from the supplier database necessary for operation the supplier database and may be, for example an internet connection, a local network connection, or any connection between electronic devices or portions of devices as are commonly known in the art. In some embodiments, more than one user data link 152 and/or supplier update data link 156 may be required, potentially along with other similar data links, particularly when, for example, user database 136 is stored in a separate location from RFP application 112 or when more than one supplier database is utilized, among other possible implementations of the invention that will become readily apparent to one of ordinary skill upon reading this disclosure in its entirety.

In operation, a user may create CAD model 108 in CAD program 104 or import a separate CAD model. When the user wishes to send an RFP to one or more suppliers 144(1) to 144(N), they may activate RFP application 112, which may send a query to supplier database 140 via user data link 152 to request information associated with one or more suppliers 144(1) to 144(N) capable of accepting an RFP. Alternatively, 112 may send a query directly to user database 136 to request information associated with one or more suppliers in user database 136 that are capable of accepting an RFP, without ever needing to access a supplier database 140. In response to the query, supplier database 140 may provide a response containing information associated with one or more suitable suppliers 144(1) to 144(N) to RFP application 112 using user data link 152. After receiving the response, RFP application 112 may populate supplier list 120 based on the contents of the response. RFP application 112 may further sort the contents of the response and/or the contents of user database 136 according to sorting criteria 132. GUI 116 may then display one or more aspects of supplier list 120 and sorter 124, such as, for example, one or more supplier names and/or ratings and user interface elements that a user can manipulate to sort one or more of the names and/or ratings. After the user has sorted desired aspects of supplier list 120 to their satisfaction, the user may select desired supplier(s) to send an RFP to, and may then manipulate GUI 116 to request that RFP application 112 produce an RFP and/or submit an RFP to one or more suppliers 144(1) to 144(N). RFP application 112 may then transmit RFP 148 to one or more user-selected suppliers 144(1) to 144(N). In some embodiments, a user may edit the contents of user database 136 using editor 128 at any time.

Figure 2:
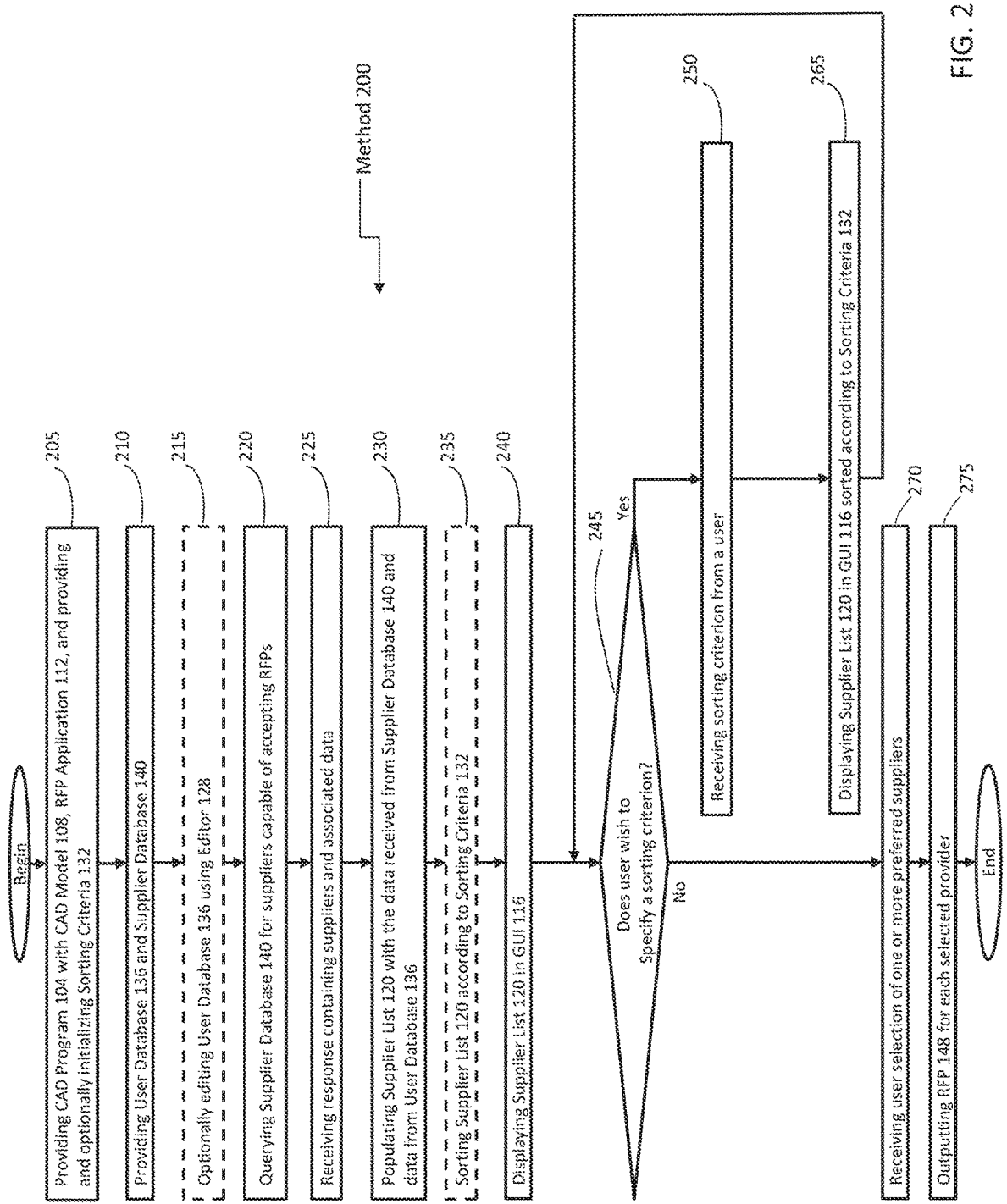
FIG. 2 is a flow diagram illustrating a method for assisting a user in generating an RFP for fabricating a computer-modeled structure.

FIG. 2 illustrates a method 200 for assisting a user in generating an RFP that can be implemented by one or more components of system 100, such as CAD program 104 and/or RFP application 112. A user may utilize method 200 to, for example, retrieve, review, sort and select suppliers and transmit one or more RFP 148 to one or more suppliers 144(1) to 144(N). In an exemplary embodiment, method 200 starts at step 205, which involves providing CAD program 104 with CAD model 108, RFP application 112, and, optionally, default sorting criteria 132. In some embodiments, a third party or other entity may provide a user with CAD program 104, and the provided CAD program may contain CAD model 108 and/or RFP application 112. Further, RFP application 112 may contain sorting criteria 132 and/or user database 136. In one embodiment, RFP application 112 may initialize sorting criteria 132 with a default setting, such as alphabetical sorting or a preferred initial set of suppliers.

At step 210, one or more users, suppliers 144(1) to 144(N), and/or another entity or entities provides user database 136 and supplier database 140, which may contain information related to one or more suppliers 144(1) to 144(N) and their capabilities. At optional step 215, a user may edit user database 136 using editor 128. For example, a user may manipulate an aspect of editor 128 in GUI 116 to provide RFP application 112 with any desired changes to user database 136. For instance, a user may add comments to user database 136 indicating a contact person and contact phone number for a particular supplier and/or may add one or more suppliers to or otherwise manage a particular distribution list within user database 136. At step 220, CAD program 104 and/or RFP application 112 queries supplier database 140 via user data link 152 for information regarding suppliers 144(1) to 144(N) capable of accepting RFPs. In one embodiment, a user may, for example, manipulate one or more aspects of GUI 116 to cause such a query to request only information regarding suppliers that have already been assigned a particular user rating or range of ratings (e.g., 3 stars or greater) and/or that are already included in a particular distribution list. In another example, a user may manipulate one or more aspects of GUI 116 to cause such a query to request only information regarding suppliers that can work aluminum, can drill holes and bend metal, and are located within 100 miles of a user's ZIP code or GPS coordinates. Further, a user, administrator, or other entity may specify automated and/or permanent (on a per-user, per-project, per-design, per-corporation, or other suitable basis) query limitations. For example, a user may manipulate GUI 116 to specify that queries should be limited to suppliers capable of working materials contained in a given project or design. Similarly, if a user manipulates one or more aspects of GUI 116 to cause a query to, e.g., request suppliers capable of working brass materials, GUI may provide an option to the user to make that limitation permanent (on a per-user or other basis). Such automated and permanent query limitations may last indefinitely or only for a short period that a user, administrator, or other entity may specify by, for example, manipulating one or more aspects of GUI 116.

At step 225, CAD program 104 and/or RFP application 112 receives a response including information associated with suppliers from supplier database 140. For example, such a response may include ten companies listed in supplier database 140 that are capable of accepting RFPs and information associated with some or each, such as one or more primary keys, supplier names, workable materials, capabilities, available processes, and/or ratings, among others. At step 230, CAD program 104 and/or RFP application 112 populates a supplier list 120 with one or more portions of the information received from supplier database 140 and/or one or more portions of information contained in user database 136. For example, RFP application 112 may correlate the information received from supplier database 140 with information contained in user database 136 (e.g., by identifying common primary keys between the supplier database and user database) in order to identify suppliers and associated information with which to populate supplier list 120. For example, RFP application 112 may populate supplier list 120 with ten companies and information associated with some or each, such as one or more primary keys, supplier names, workable materials, available processes, ratings, associated distribution lists, and/or comments.

At optional step 235, RFP application 112 may sort one or more aspects of supplier list 120 according to sorting criteria 132. For example, a user may interact with one or more aspects of editor 128 and/or GUI 116 to cause RFP application 112 to sort suppliers in the order dictated by sorting criteria 132 (e.g., alphabetical order by supplier name). Sorting criteria 132 may contain a set of initial sorting rules which may be applied at this time. At step 240, GUI 116 displays one or more aspects of supplier list 120. At step 245, RFP application 112 offers an opportunity for a user to specify one or more custom sorting criteria. If a user wishes to specify a custom sorting criterion, method 200 proceeds to step 250; however, if a user does not wish to specify a custom sorting criterion, the method proceeds to step 270.

At step 250, a user manipulates GUI 116 or otherwise provides an indication of a desired custom sorting criterion to RFP application 112. For example, a user may indicate that sorter 124 or RFP application 112 should sort suppliers in supplier list 120 by rating in order from largest-to-smallest. Or a user may wish to search only within a pre-defined preferred group of suppliers or only within a group of suppliers newly enrolled in Supplier Database 140. At step 265, GUI 116 displays one or more aspects of supplier list 120 sorted according to sorting criteria 132. Finally, after step 265, method 200 returns to step 245, at which point RFP application 112 may offers another opportunity for a user to specify one or more custom sorting criterion.

At step 270, after a user indicates that they do not wish to specify any further custom sorting criterion at step 245, RFP application 112 receives a user selection of one or more preferred suppliers. A user may base such a selection on ratings, capabilities, and/or other information, such as information contained in supplier list 120, and may provide such a selection by manipulating GUI 116 or otherwise interacting with RFP application 112. At step 275, CAD program 104 and/or RFP application 112 output one or more RFP 148 and may optionally communicate the one or more RFP to one or more suppliers in accordance with the user selection provided at step 270.

Figure 3:
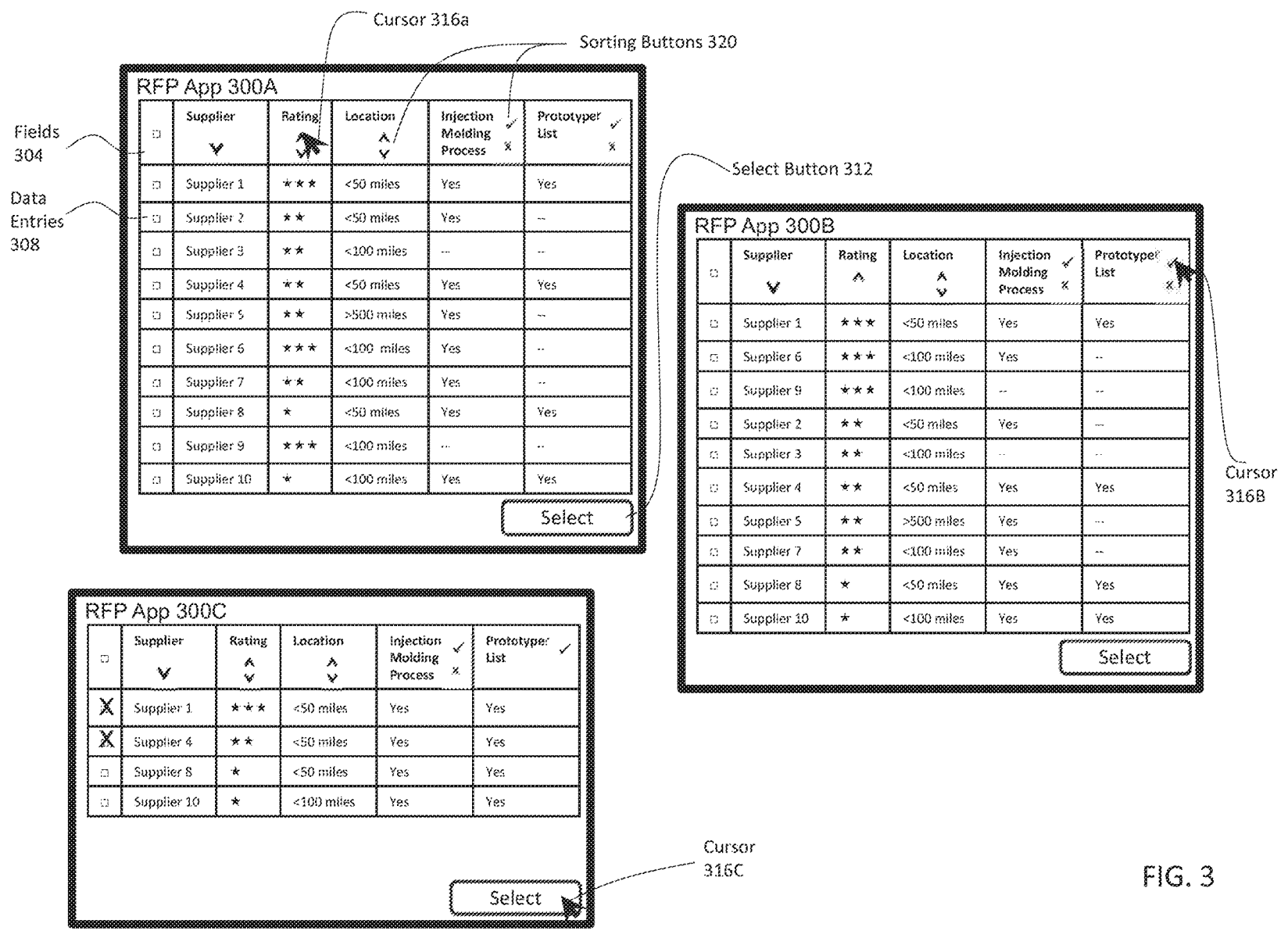

FIG. 3 illustrates a series of screenshots depicting exemplary aspects of RFP system 100. Screenshot 300A represents GUI 116 as a user may see it during operation of RFP system 100. In this example, screenshot 300A includes five exemplary fields 304, which may include categories of information according to which a user may sort one or more aspects of supplier list 120 via sorter 124. Fields 304 may include various categories of information stored in supplier database 140 such as supplier names and one or more associated ratings, available processes (e.g., injection molding), distance between the supplier and user, and/or distribution lists (e.g., a prototype distribution list), among others. In some embodiments, a user and/or an entity operating supplier database 140, among others, may add additional fields to supplier list 120 by, for example, using editor 128. Screenshot 300A further includes data entries 308 associated with fields 304, which may include a name of a particular supplier and one or more associated ratings, available processes, distances, and/or distribution lists. Screenshot 300A further includes a select button 312, which may be, for example, a soft selection button in GUI 112. A user may utilize select button 312 by, for example, clicking it with a mouse or otherwise selecting it in order to indicate that they wish to send one or more RFP 148 to selected suppliers. Screenshot 300A also includes a cursor 316A that a user can utilize to manipulate one or more aspects of GUI 112 through, e.g., a mouse or other pointing device. Finally, screenshot 300A includes sorting buttons 320, which may be a set of soft selection buttons and/or toggles associated with in sorter 124 in GUI 112. A user may manipulate sorting buttons 320 in order to sort one or more aspects of supplier list 120 by, for example, selecting any one of the sorting buttons.

Screenshot 300B represents GUI 116 as a user may see it during operation of RFP system 100 after the user has caused sorter 124 to sort one or more aspects of supplier list 120 by descending ratings. As in screenshot 300A, screenshot 300B also includes a cursor 316B. Screenshot 300C represents GUI 116 as a user may see it during operation of RFP system 100 after the user has caused sorter 124 to additionally sort one or more aspects of supplier list 120 according to whether the individual suppliers are included in a prototype distribution list. In this example, after such additional sorting, GUI 116 no longer displays suppliers not included in the prototype distribution list. In some embodiments, users, administrators, and/or other entities can optionally specify whether to continue displaying suppliers that do not meet one or more aspects of one or more sorting criterion in the form of a global setting that applies to all sorting criterion, a setting that applies only to one or more particular criterion, a setting that applies to one or more users, or a setting that applies to one or more projects or designs, among others. In this example, as shown in screenshot 300C, after the sorter has reduced the supplier choices to only those on the Prototyper List, a user then has selected two suppliers (Supplier 1 and Supplier 4). As in screenshots 300A and 300B, screenshot 300C also includes a cursor 316C, which, in screenshot 300C, is poised to click select button 312 in order to cause RFP application 112 to generate one or more RFP 148.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
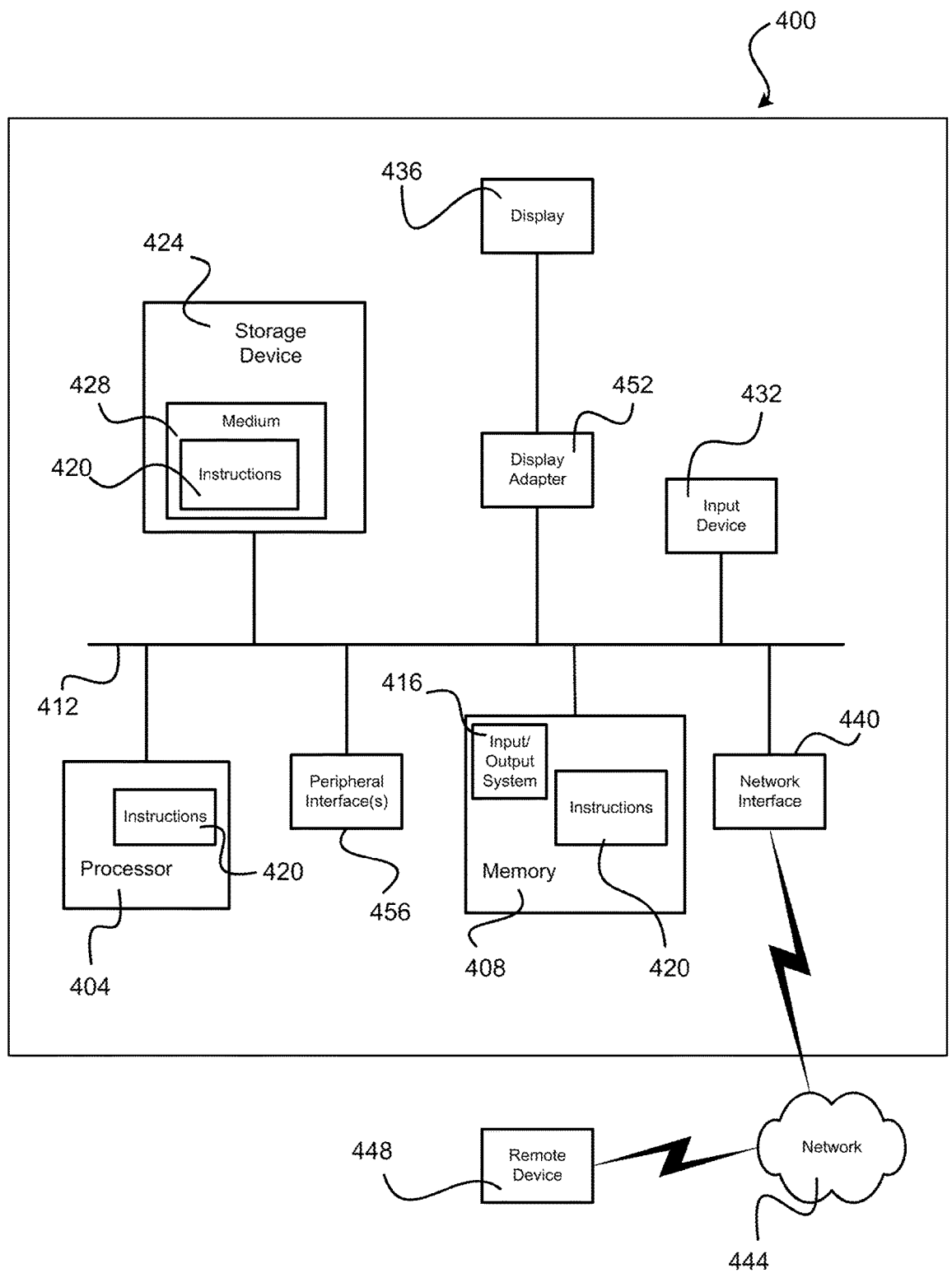
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system, such as the RFP system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine readable media) including, but not limited to, a random access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A method of assisting a user in generating a request for pricing (RFP) of a price for fabricating one or more instantiations of a structure represented in a computer model, the method being executed in a computer-aided design (CAD) program and comprising:
    presenting to the user, in an RFP user interface, a list of suppliers that provide fabrication services;
    prior to the presenting, retrieving supplier identifiers from a supplier database, wherein the supplier database is contained in an RFP software application;
    receiving from the user via the RFP user interface a selection of plurality of suppliers from the list of suppliers to create a selected plurality of suppliers;
    generating the RFP as a function of the selected plurality of suppliers and an edit of a supplier identifier, wherein the edit of the supplier identifier is received via the RFP user interface; and
    automatedly sending the RFP to each supplier of the plurality of suppliers for which a selection is received in conjunction with said receiving.

2. A method according to claim 1, wherein the supplier database is contained in the CAD program.

3. A method according to claim 1, further comprising providing a supplier-database user interface to the user that allows the user to populate the supplier database.

4. A method according to claim 1, wherein the supplier-database is personal to the user.

5. A method according to claim 1, wherein the supplier database is populated by entities other than the user.

6. A method according to claim 1, wherein the list of suppliers is predefined by the user.

7. A method according to claim 1, further comprising:
    receiving at least one sort criterion from the user; and
    sorting the list of suppliers as a function of the at least one search criterion.

8. A method according to claim 1, wherein said generating the RFP includes generating the RFP from a computer model.

9. A method according to claim 1, wherein said automatedly sending the RFP includes emailing the RFP.

10. A method according to claim 1, further comprising associating at least one supplier with a field in a database, the field containing information related to one or more of 1) a material workable by the supplier, 2) a capability of the supplier, 3) a process the supplier can perform, 4) a geographical location associated with the supplier, and 5) a rating associated with the supplier.

11. A machine-readable storage medium containing machine-executable instructions for performing a method assisting a user in generating a request for pricing (RFP) of a price for fabricating one or more instantiations of a structure represented in a computer model, the method being executed in a CAD program and comprising:
    a first set of machine-executable instructions for presenting to the user, in an RFP user interface, a list of suppliers that provide fabrication services;
    a second set of machine-executable instructions receiving from the user via the RFP user interface a selection of plurality of suppliers from the list of suppliers to create a selected plurality of suppliers;
    a third set of machine-executable instructions for generating the RFP as a function of the selected plurality of suppliers and an edit of a supplier identifier, wherein the edit of the supplier identifier is received vis the RFP user interface;
    a fourth set of machine-executable instructions for automatedly sending the RFP to each supplier of the plurality of suppliers for which a selection is received in conjunction with said receiving; and
    machine-executable instructions for retrieving supplier identifiers from a supplier database.

12. A machine-readable storage medium according to claim 11, further comprising machine-executable instructions for providing a supplier-database user interface to the user that allows the user to populate the supplier database.

13. A machine-readable storage medium according to claim 11, further comprising machine-executable instructions for receiving at least one sort criterion from the user; and sorting the list of suppliers as a function of the at least one search criterion.

14. A machine-readable storage medium according to claim 11, further comprising machine-executable instructions for associating at least one supplier with a field in a database, the field containing information related to one or more of 1) a material workable by the supplier, 2) a capability of the supplier, 3) a process the supplier can perform, 4) a geographical location associated with the supplier, and 5) a rating associated with the supplier.

* * * * *